UNITED STATES PATENT OFFICE.

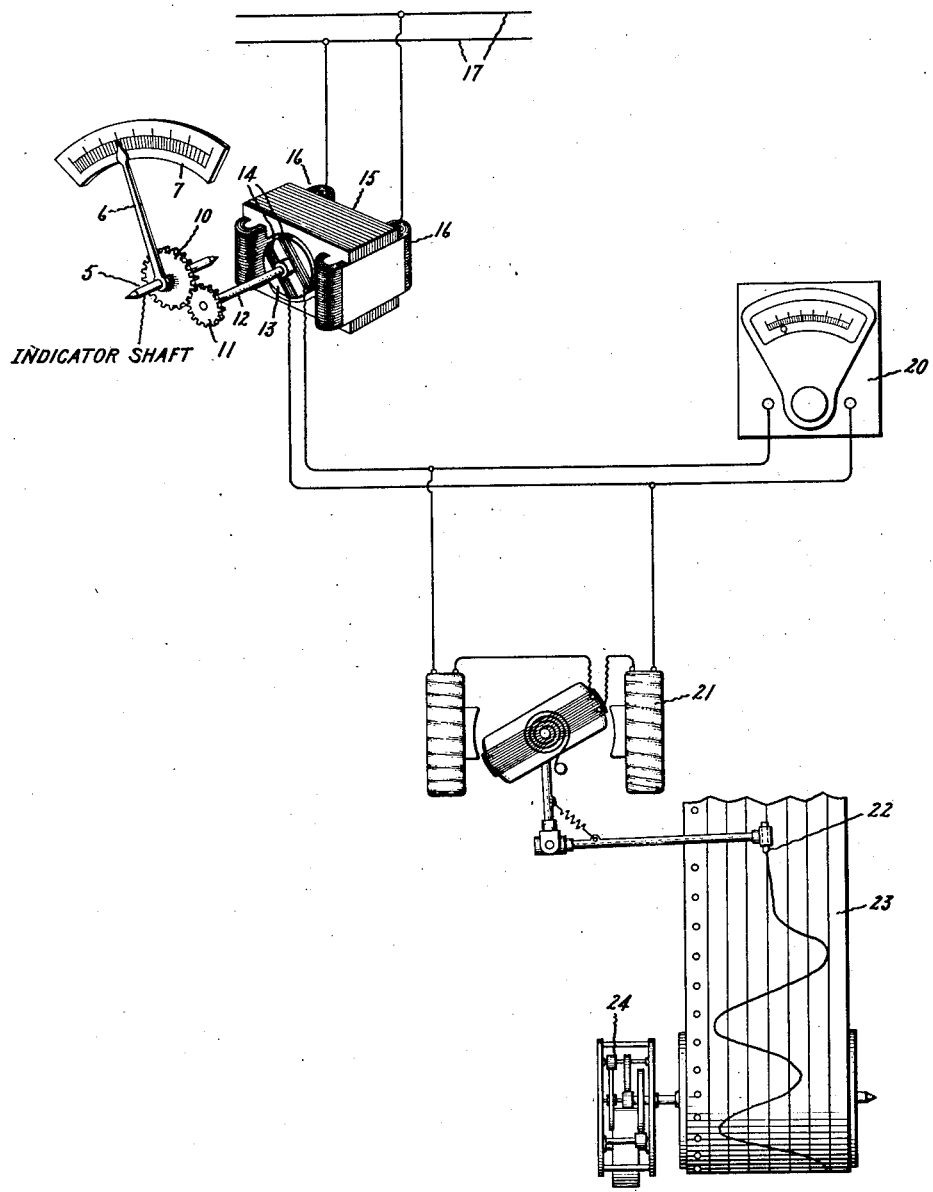

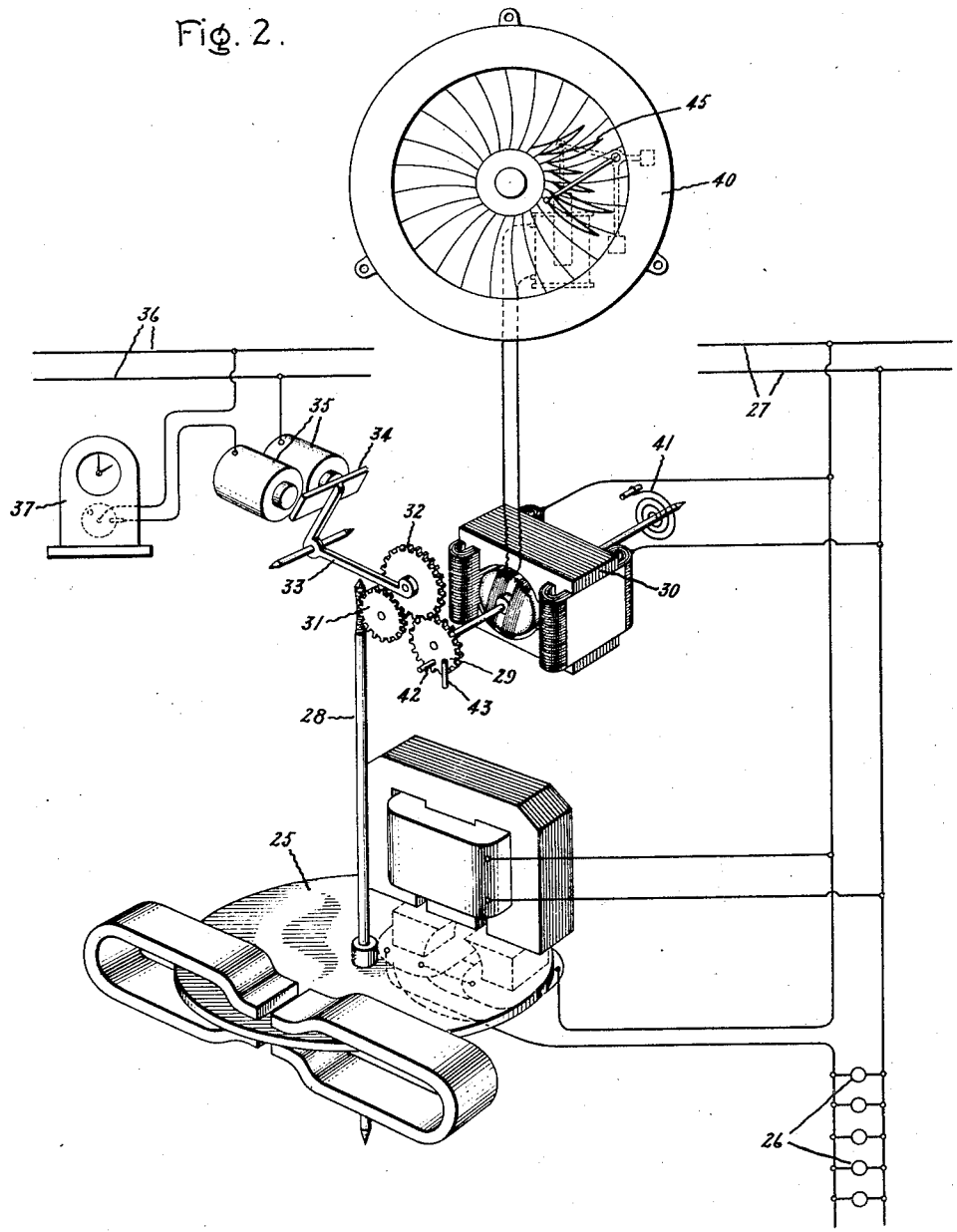

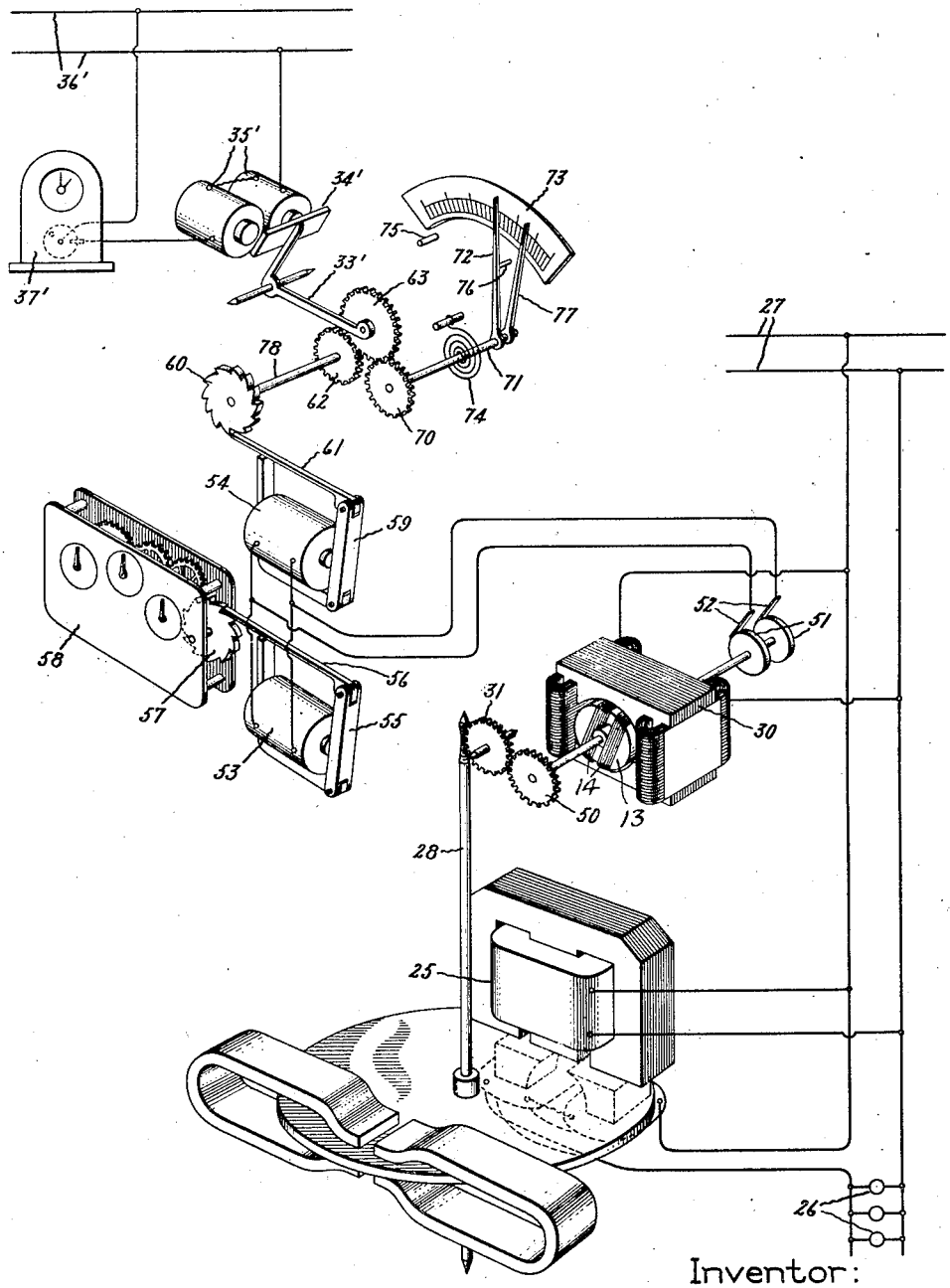

CHESTER I. HALL, OF FORT WAYNE, INDIANA, ASSIGNOR TO GENERAL ELECTRIC COMPANY, A CORPORATION OF NEW YORK.

POSITION INDICATOR OR RECORDER.

1,267,214.

Specification of Letters Patent.  Patented May 21, 1918.

Application filed June 15, 1916. Serial No. 103,852.

*To all whom it may concern:*

Be it known that I, CHESTER I. HALL, a citizen of the United States, residing at Fort Wayne, in the county of Allen, State of Indiana, have invented certain new and useful Improvements in Position Indicators or Recorders, of which the following is a specification.

My invention relates to devices for producing a secondary motion or movement corresponding to a primary motion or movement, and particularly to devices for reproducing or indicating the movement of a primary movable member at some point more or less remote from the primary member. Such devices I shall hereinafter call position indicators or recorders, since they operate to indicate or record variations in the position of, and hence movement of, the primary movable member. The invention has for its object the provision of an improved position indicator or recorder, and more particularly the provision of an improved device of this character for indicating or recording at one or more distant places variations in the position or movement of a primary movable member.

It is often desirable and frequently necessary to indicate variations in the position or movement of a primary movable member at some central or convenient place more or less remote from the location of the primary member. Such necessities are found in the case of water level indicators, in the case of end-cell-switch distant-dial mechanisms, in the case of switchboard instruments in central stations, where the primary instrument is more advantageously mounted near the operating source, but where a reproduction of the instrument's reading is required on the switchboard, and in many other cases which might be mentioned. Such position indicators, to be popularly applied, must be very simple, inexpensive and absolutely reliable, and the purpose of my present invention is to provide a position indicator or recorder possessing these characteristics.

The invention is particularly applicable to electric meters and instruments for transmitting the motion of the movable elements thereof to any desired distant indicator or recorder. Thus, in the case of electric motor meters, my present invention may be very advantageously employed to transmit the motion of the rotatable element of the meter to an ordinary register located at any desired place, or to a maximum demand device of the indicating or recording type. In this connection, a further object of the invention is to provide in combination with an electric meter an improved means for transmitting motion of the rotatable element of the meter to any suitable device.

The novel features of the invention which I believe to be patentable are definitely indicated in the claims appended hereto. The principle of the invention and its application to and embodiment in certain apparatus will be better understood from the following description taken in conjunction with the accompanying drawings, in which:

Figure 1 is a diagrammatic view of a distant position indicator and recorder embodying the invention; Fig. 2 is a diagrammatic view of a demand apparatus embodying the invention; and Fig. 3 is a diagrammatic view of an apparatus embodying the invention for transmitting the motion of an electric motor meter to an ordinary meter register and to a maximum demand device.

Referring first to Fig. 1 of the drawings, there is diagrammatically shown an indicator shaft 5 to which is secured a pointer 6. The shaft 5 may be the movable shaft of any indicator or recorder, such for example as a pressure gage, an electrical measuring instrument, or the like. In Fig. 1 of the drawings I have shown a scale 7 across which the pointer 6 is adapted to sweep. The shaft 5 and pointer 6 thus constitute the moving element of any primary indicator, and, broadly, may be taken to represent any movable element whose position with respect to the scale 7 it is desired to obtain an indication of at one or more distant points.

A gear 10 is secured to the shaft 5 and meshes with a gear 11 secured to a shaft 12. A cylindrical magnetic core 13 is mounted on the shaft 12 and carries a pair of coils or windings 14. The magnetic core 13 is rotatably mounted in a cylindrical opening in a stationary magnetic core 15. The stationary core 15 has mounted thereon coils or windings 16 connected to a suitable source of alternating current energy 17. The coils 16 constitute in effect the primary winding of a transformer of which the coils 14 are the secondary winding. Movement of the rotatable core 13 varies the relative positions of the primary and secondary windings of this transformer, and hence varies the mutual induction of these windings. The voltage induced in the secondary winding depends upon the mutual induction of the primary and secondary windings, and hence any variation in the mutual induction causes a variation in the induced secondary voltage. When the axes of the primary and secondary windings 16 and 14 are perpendicular no voltage is induced in the secondary winding 14. As the magnetic core 13 is rotated from this position of zero voltage in either direction, a gradually increasing voltage is induced in the secondary winding 14, due to the increase in the mutual induction of the primary and secondary windings caused by such rotation. The maximum secondary voltage is obtained when the axes of the primary and secondary windings 16 and 14 are parallel. The device is thus a transformer in which the mutual induction of the primary and secondary windings is variable for the purpose of varying the induced secondary voltage. The device may thus be called a variable voltage transformer of the induction type, or more briefly an induction voltage regulator. For the sake of simplicity, I will hereinafter call the device a voltage regulator.

The coils 14 are connected to an alternating current voltmeter 20 of the indicating type and to the voltmeter element 21 of a graphic recording voltmeter. The moving element of the voltmeter 21 has a marking stylus or pen 22 adapted to move across a record chart 23. The record chart is driven by any suitable time-keeping mechanism, such as a clock 24.

It will be evident from the foregoing description that movement of the shaft 5 alters the relative positions of the coils 16 and 14, and thus varies the voltage induced in the coils 14. The voltage induced in the coils 14 is indicated by the voltmeter 20 and is graphically recorded by the voltmeter 21, and these two voltmeters will indicate and record, respectively, every variation in the position of the indicator shaft 5.

In Fig. 2 of the drawings there is diagrammatically represented an electric meter 25 of the well known induction type operatively connected to measure the electric energy taken by translating devices 26 from an alternating current source of supply 27. The rotatable shaft 28 of the induction meter is adapted to drive a gear 29 secured to the shaft of the rotatable member of the voltage regulator 30. The elements of the voltage regulator 30 are identical with those of the voltage regulator described in detail in connection with Fig. 1. The gear 29 is driven from the meter shaft 28 by means of a worm gear 31 and a movable idler 32. The idler 32 is carried by one arm of an L-shaped lever 33, and the armature 34 of a pair of electromagnets 35 is mounted on the other arm of the lever 33. The electromagnets 35 are energized from direct current mains 36 at the end of equal time intervals by means of a suitable time switch mechanism 37.

The secondary winding of the voltage regulator 30 is connected to a curve drawing voltmeter 40. A spiral spring 41 tends to maintain the movable magnetic core of the regulator in its zero or initial position with the pin 42, secured to the gear 29, resting against a fixed stop 43. When the movable magnetic core of the regulator is in its initial position, the axes of the primary and secondary windings are substantially perpendicular, and no voltage is induced in the secondary winding.

The operation of the apparatus of Fig. 2 is as follows: Rotation of the meter shaft 28 is transmitted to the rotatable magnetic core of the voltage regulator 30, and the secondary winding of the regulator is moved from a position of zero voltage to positions of gradually increasing voltage. The voltage of the secondary winding of the regulator is thus a measure of the number of revolutions of the meter shaft from the beginning of the existing time interval, because the voltage induced in the secondary winding depends upon the position of the rotatable magnetic core and the position of the latter depends upon the number of revolutions of the meter shaft since the beginning of the existing time interval. At the end of the predetermined time interval the electromagnets 35 are energized by the closing of the time switch 37, whereupon the idler 32 is elevated and thus operates to disengage the driving connection between the meter shaft 28 and the gear 29. The spring 41 then returns the movable magnetic core of the voltage regulator to its initial position. The electromagnets 35 are energized for a sufficient length of time to permit the movable member of the voltage regulator to return to its zero or initial position and are then deënergized, whereupon the cycle of operations is repeated. A saw tooth record 45 is thus obtained from the curve drawing voltmeter 40, and the radial length of these saw teeth represent the amounts of electric energy consumed in the translating devices 26 during each of the equal time intervals. The apparatus will usually be so designed that the maximum angular movement of the rotatable core of the regulator 30 during any time interval of measurement will be less than 90 angular degrees.

In the apparatus of Fig. 3 of the drawings, the worm gear 31, driven by the meter shaft 28 of the induction meter 25, is directly connected to a gear 50 on the shaft of the rotatable member of the voltage regulator 30. Thus rotation of the meter shaft 28 is continuously transmitted to the rotatable magnetic core of the regulator. By means of slip rings 51 and coöperating brushes 52 the secondary winding of the voltage regulator is electrically connected to alternating current electromagnets 53 and 54. The armature 55 of the electromagnet 53 is connected to a push arm 56 which is adapted to turn a ratchet 57 in a counter-clockwise direction each time the electromagnet 53 is energized. The ratchet 57 is arranged to drive the ratio gearing of an ordinary meter register 58. Similarly, the armature 59 of the electromagnet 54 drives a ratchet 60 by means of a push arm 61. The ratchet 60 is secured to a shaft 78, and a gear 62 is also secured to this shaft. The gear 62 meshes with an idler 63 carried by one arm of an L-shaped lever 33′. The other arm of this lever carries the armature 34′ of a pair of electromagnets 35′. The electromagnets 35′ are adapted to be periodically energized from the D. C. mains 36′ by means of a time switch 37′. A gear 70 carried by a shaft 71 meshes with the idler 63. The shaft 71 also carries a pointer 72 arranged to sweep across a scale 73. A control spring 74 tends to return the shaft 71 and pointer 72 to their respective initial positions, determined when the pointer engages a fixed stop 75. The pointer 72 has a dog 76 which is adapted to engage a non-return pointer 77. The position of the non-return pointer 77 thus indicates the maximum movement of the pointer 72.

The operation of the apparatus of Fig. 3 is as follows: The voltage regulator 30 is directly and continuously connected to the meter shaft 28. Rotation of the meter shaft thus causes a sine wave of voltage to be induced in the secondary winding of the regulator and the frequency of this sine wave of voltage depends upon the speed at which the meter shaft 28 rotates. The electromagnets 53 and 54 are energized when the voltage of the sine wave induced in the secondary of the voltage regulator nears its peak value in either direction. Thus, the electromagnets 53 and 54 are energized twice during each complete revolution of the rotatable member of the potential regulator. In this manner the rotation of the meter shaft 28 is transmitted to the register 58 and to the pointer 72 of the maximum demand device. The non-return pointer 77 thus indicates the maximum demand during any one of the preceding equal intervals of the time that the apparatus has been in operation.

It will be evident from the foregoing description that I have provided a position indicator which can be satisfactorily employed to accurately indicate or record movements of a primary movable member. The device of my present invention contains no contacts with the attendant difficulties or arcing, sticking and failure to operate, etc. The device is of extremely simple construction and resembles in external appearance a small motor having a gear on its shaft adapted to be connected to the primary movable member. The load imposed on the primary movable member in driving the movable magnetic core of the regulator is very small and in most cases is practically negligible. At the same time sufficient current can be taken from the secondary winding of the regulator to operate any desired number of voltage responsive means, such as voltmeters, relays, and the like. It will furthermore be observed that any number of voltage responsive means may be connected to the secondary winding of the regulator and only two main conductors or wires are needed, since such means may be connected in parallel.

While I have mentioned certain particular applications of the improved position indicator of my present invention, many other applications and uses of the same will occur to those skilled in the art. I do not, therefore, wish to be restricted to the particular uses of my invention herein specifically mentioned, and I desire to cover in the appended claims all modifications within the spirit of the invention.

What I claim as new and desire to secure by Letters Patent of the United States, is:

1. An apparatus for producing a secondary motion indicative of a primary motion comprising in combination, a primary rotatable member, a variable voltage transformer having a stationary magnetic core and a rotatable magnetic core and a primary winding on one of said cores and a secondary winding on the other of said cores, said primary and secondary windings being so arranged that continuous rotation of said movable core periodically varies the amount of primary flux inductively acting upon said secondary winding from zero to a predetermined maximum and back to zero, means operatively connecting said rotatable member to said rotatable core so that continuous rotation of said member produces a corresponding continuous rotation of said core, means for supplying alternating current to the primary winding of said transformer, and an electromagnetic actuator electrically connected to the secondary winding of said transformer and adapted to be actuated by the variation in the magnitude of the alternating electromotive force induced in said secondary winding by the rotation of said core whereby the number of actuations of said actuator are proportional to the revolutions of said primary rotatable member.

2. An apparatus for producing a secondary motion indicative of a primary motion comprising in combination, a primary member mounted for continuous rotation, a variable voltage transformer having a stationary magnetic core and a rotatable magnetic core and a primary winding on one of said cores and a secondary winding on the other of said cores, said primary and secondary windings being so arranged that continuous rotation of said movable core periodically varies the magnitude of the alternating electromotive force induced in said secondary winding from zero to a predetermined maximum and back to zero, means operatively connecting said rotatable member to said rotatable core so that continuous rotation of said member produces a corresponding continuous rotation of said core, means for supplying alternating current to the primary winding of said transformer, an electromagnet electrically connected to the secondary winding of said transformer and adapted to be effectively energized when an alternating electromotive force of a predetermined magnitude is induced in said secondary winding, and actuating means including a movable armature operatively associated with said electromagnet and adapted to be actuated when said electromagnet is effectively energized.

3. An apparatus for producing a motion corresponding to the revolutions of an electric meter comprising in combination, an electric meter having a rotatable shaft, a variable voltage transformer having a stationary magnetic core and a rotatable magnetic core and a primary winding on one of said cores and a secondary winding on the other of said cores, said primary and secondary windings being so arranged that continuous rotation of said movable core periodically varies the magnitude of the alternating electromotive force induced in said secondary winding from zero to a predetermined maximum and back to zero, means operatively connecting said rotatable shaft to said rotatable core so that continuous rotation of said shaft produces a corresponding continuous rotation of said core, means for supplying alternating current to the primary winding of said transformer, an electromagnet electrically connected to the secondary winding of said transformer and adapted to be effectively energized when an alternating electromotive force of a predetermined magnitude is induced in said secondary winding whereby the number of times said electromagnet is effectively energized is proportional to the revolutions of said meter shaft, and indicating means including a movable armature operatively associated with said electromagnet and adapted to be actuated when said electromagnet is effectively energized.

In witness whereof, I have hereunto set my hand this 12th day of June 1916.

CHESTER I. HALL.